United States Patent
Korn et al.

(10) Patent No.: US 10,804,657 B2
(45) Date of Patent: Oct. 13, 2020

(54) COMMUNICATION ADAPTER FOR A TRANSMITTER OF A FIELD DEVICE

(71) Applicant: Endress+Hauser Wetzer GmbH+Co. KG, Nesselwang (DE)

(72) Inventors: Michael Korn, Marktoberdorf (DE); Thomas Härle, Oy-Mittelberg (DE); Thomas Jögel, Immenstadt (DE); Michael Warnking, Sonthofen (DE); Robert Zeller, Lechbruck (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 0 days.

(21) Appl. No.: 16/463,912

(22) PCT Filed: Oct. 11, 2017

(86) PCT No.: PCT/EP2017/075923
§ 371 (c)(1),
(2) Date: May 24, 2019

(87) PCT Pub. No.: WO2018/095648
PCT Pub. Date: May 31, 2018

(65) Prior Publication Data
US 2019/0296501 A1    Sep. 26, 2019

(30) Foreign Application Priority Data
Nov. 24, 2016  (DE) .................. 10 2016 122 714

(51) Int. Cl.
*H01R 13/66*  (2006.01)
*G01D 21/00*  (2006.01)
(Continued)

(52) U.S. Cl.
CPC ......... *H01R 13/6691* (2013.01); *G01D 21/00* (2013.01); *G01F 1/00* (2013.01);
(Continued)

(58) Field of Classification Search
CPC ...... G01D 21/00; G01F 15/068; G08C 17/02; H01R 13/6666; H01R 13/6675; H01R 13/6691; H01R 2103/00; H01R 2201/20
See application file for complete search history.

(56) References Cited

U.S. PATENT DOCUMENTS 7,262,693 B2    8/2007  Karschnia et al.
2009/0216496 A1* 8/2009  Umkehrer ............. G08C 19/02
                                                    702/188
(Continued)

FOREIGN PATENT DOCUMENTS

DE    102006051900 A1    5/2008
DE    102014110385 A1    1/2016
(Continued)

OTHER PUBLICATIONS

Search Report for German Patent Application No. 10 2016 122 714.5, German Patent Office, dated Sep. 27, 2017, 10 pp.
(Continued)

*Primary Examiner* — Sisay Yacob
(74) *Attorney, Agent, or Firm* — Mark A. Logan; Endress+Hauser (USA) Holding Inc.

(57) ABSTRACT

The present disclosure relates to an adapter for a 2-wire field device, especially a 2-wire field device of process and/or automation technology, comprising a communication unit for, especially wireless, especially bi directional, communication with an external unit, and an energy storage unit for supply of at least the communication unit with electrical energy. According to the present disclosure, the adapter includes a first connection element for, especially electrical, contacting of the adapter with a second, first connection element complementary, connection element of the field device, wherein the at least two connection elements are embodied for supply of at least the adapter with electrical energy and for exchanging information. Furthermore, the
(Continued)

present disclosure relates to a transmitter with an adapter of the present disclosure as well as a 2-wire field device having an adapter of the present disclosure or a transmitter of the present disclosure.

12 Claims, 2 Drawing Sheets

(51) Int. Cl.
| | | |
|---|---|---|
| *G01F 15/06* | (2006.01) | |
| *G08C 17/02* | (2006.01) | |
| *G01F 1/00* | (2006.01) | |
| *G01F 23/00* | (2006.01) | |
| *H01R 103/00* | (2006.01) | |

(52) U.S. Cl.
CPC ............ *G01F 15/068* (2013.01); *G01F 23/00* (2013.01); *G08C 17/02* (2013.01); *H01R 13/6666* (2013.01); *H01R 13/6675* (2013.01); *H01R 2103/00* (2013.01); *H01R 2201/20* (2013.01)

(56) References Cited

U.S. PATENT DOCUMENTS

| | | | |
|---|---|---|---|
| 2010/0132454 A1* | 6/2010 | Wernet | G08C 19/02 73/304 R |
| 2010/0306567 A1* | 12/2010 | Seiler | G05B 19/4185 713/330 |
| 2014/0170989 A1 | 6/2014 | Ichtertz | |
| 2015/0002185 A1 | 1/2015 | McGuire et al. | |
| 2016/0104979 A1* | 4/2016 | Korn | H04W 12/00 439/620.21 |

FOREIGN PATENT DOCUMENTS

| | | |
|---|---|---|
| WO | 2006106055 A2 | 10/2006 |
| WO | 2009040191 A1 | 4/2009 |

OTHER PUBLICATIONS

Search Report for International Patent Application No. PCT/EP2017/075923, WIPO, dated Jan. 30, 2018, 12 pp.

* cited by examiner

COMMUNICATION ADAPTER FOR A TRANSMITTER OF A FIELD DEVICE

CROSS-REFERENCE TO RELATED APPLICATIONS

The present application is related to and claims the priority benefit of German Patent Application No. 10 2016 122 714.5, filed on Nov. 24, 2016 and International Patent Application No. PCT/EP2017/075923 filed on Oct. 11, 2017, the entire contents of which are incorporated herein by reference.

TECHNICAL FIELD

The invention relates to an adapter for a transmitter of a field device. The adapter serves for communication, especially wireless communication, of the transmitter with an external unit. Furthermore, the invention relates to a transmitter for a 2-wire field device, especially a 2-wire field device of process- and/or automation technology, which transmitter serves for determining and/or monitoring at least one process variable, and which transmitter includes an adapter of the invention.

BACKGROUND

Field devices for determining, monitoring and/or influencing various process variables are widely applied in process and/or automation technology. Examples of such field devices include fill level measuring devices, flow measuring devices, pressure- and temperature measuring devices, pH- and/or pH-redox potential measuring devices, and also conductivity measuring devices, which serve for registering the corresponding process variables, fill level, flow, pressure, temperature, pH-value, redox potential, and conductivity. The underlying measuring principles for each of these are sufficiently known from the state of the art, and are not individually set forth here. In the case of flow measuring devices, especially of concern are Coriolis-, ultrasonic-, vortex-, thermal and/or magneto inductive flow measuring devices. Fill level measuring devices, in turn, include, especially, microwave fill level measuring devices, ultrasonic, fill level measuring devices, time domain, reflectometric, fill level measuring devices (TDR), radiometric fill level measuring devices, capacitive fill level measuring devices, conductive fill level measuring devices and/or temperature sensitive, fill level measuring devices. Pressure measuring devices involve, preferably, absolute-, relative- and difference pressure devices, while temperature measuring devices frequently use thermocouples or temperature dependent resistances for ascertaining the temperature.

In the context of the present invention, in principle, referred to as field devices are all devices, which are arranged at the field level, thus, in principle, are applied near to the process and deliver, or process, process relevant information. Besides sensors and actuators, referred to as field devices are generally also such units, which are connected directly to a fieldbus, and which serve for communication with a control unit such as a control system, i.e. units such as e.g. remote I/Os, gateways, linking devices and wireless adapters, or radio adapters. A large number of such field devices are produced and sold by the companies of the Endress+Hauser Group.

Field devices often use means for displaying and/or transmission of information, e.g. data, such as, for example, operating states, measured values, device parameters or the like. While in the case of information displays, such as, for example, monitors, or also optical or acoustic indicating elements, the information is essentially available locally at the site of the field device, the most varied of communication means permit the transmission of information to other field devices, or also to a superordinated unit, such as, for example, a control station. In this regard, a large number of wired as well as wireless standards and technologies are known in the state of the art. There is, in such case, however, increasingly a desire to eliminate wired data transmission units. In this way, in industrial applications, for example, costs for wiring can be reduced, which means that fitness for purpose is improved, so that an advantage for the user can be generated. Moreover, a wireless data transmission enables a significantly simpler handling, especially with reference to parametering field devices, as performed, for example, in the case of start-up.

Often used for energy supply of a field device is the so-called two wire technology, also referred to as two conductor technology, wherein a field device is connected via a single pair of lines to a control station. Thus, both the energy supply, especially in the form of a supply current, and also a data-, or information transfer occur via the shared pair of lines. In such case, a first wire, i.e. a first line, is utilized for the outgoing direction, and a second wire, i.e. a second line, for the return path. The electrical current supply provided via the two-wire cable, or the corresponding electrical power, must be suitably managed by a particular field device and divided among the individual components of the field device. Two wire cables are, furthermore, frequently designed for 4-20 mA interfaces. This has the result that only a very limited power is available for the field devices. If the field device is to perform, besides a measured value registering, yet other functions, such as, for example, a function for wireless communication, the design and construction of the device becomes very demanding.

A solution known from U.S. Pat. No. 7,262,693 includes the provision of one or more capacitors for the purpose of intermediate storage of energy from the two-wire cable, or from the two conductor fieldbus, in the field device. The energy stored interim by means of the one or more capacitors is then provided to a wireless module, which temporarily requires a large power, or energy, for transmitting data and/or information. Both the capacitors as well as also the wireless module are, in such case, directly fed from the two-wire cable. The field device must thus be suitably embodied from the outset.

SUMMARY

An object of the invention is to provide an opportunity to equip a two-wire field device in as simple manner as possible with a wireless module for communication.

As regards the adapter, the object of the invention is achieved by an adapter for a 2-wire field device, especially a 2-wire field device of process and/or automation technology. The adapter includes, in such case, at least one communication unit for, especially wireless, especially bi directional, communication with an external unit, and an energy storage unit for supply of at least the communication unit with electrical energy. Furthermore, the adapter of the invention includes at least a first connection element for, especially electrical, contacting of the adapter with a second, first connection element complementary, connection element of the field device, wherein the at least two connection elements are embodied for supply of at least the adapter with electrical energy and for exchanging information, e.g. data.

The field device is, for example, a measuring device having a sensor unit and an electronics unit. The field device serves determining and/or monitoring at least one process variable of a liquid in a containment.

The adapter of the invention is, thus, not directly connected to the process loop, but, instead, to a connection element of the field device. This connection element is preferably arranged in an electronics unit, especially in a transmitter, of the field device. The field device, thus, advantageously only needs to have a suitable connection element. Both the energy supply of the adapter as well as also the transmission of data, or information, between the field device and the adapter occurs via the connection element of the field device and the connection element of the adapter, e.g., in each case, in the form of electrical signals.

In an embodiment, the adapter includes a unit for electrical current- and/or voltage limiting. This unit is especially embodied in such a manner that it enables application of the field device in explosion endangered atmospheres.

Another embodiment provides that each of the two connection elements is embodied to perform the supply of at least the adapter with electrical energy and the exchanging of information separately from one another. Preferably, each element includes at least a first contact element for energy supply and at least a second contact element for information-, or data transmission.

Preferably, the connection elements are embodied in such a manner that the supply with electrical energy and/or the exchanging of information is/are performable bidirectionally. Thus, not only the adapter can be supplied with electrical energy via the field device. Rather, likewise the field device can be supplied with electrical energy via the adapter. The same holds for exchanging information, which can be transmitted both from the adapter to the field device as well as also from the field device to the adapter. Of concern, thus, are essentially bidirectional connection elements, wherein the energy supply and/or the transmitting of data, or information, can be performed bidirectionally.

In an additional preferred embodiment, the two connection elements are each an, especially serial, interface, for example, a CDI, UART, I2C or SPI-interface.

An embodiment provides that the communication unit includes a wireless signal transmission unit, especially a Bluetooth module. However, many other technologies for wireless data transmission are sufficiently known in the state of the art, and equally fall within the scope of the present invention.

In an embodiment, the adapter includes a computing unit, which is at least embodied to control the supply of the communication unit with electrical energy via the connection elements and/or via the energy storage unit. The computing unit can, furthermore, serve for processing, conditioning, converting and/or forwarding signals containing data, or information, from the communication unit and/or the field device. In such case, the computing unit can, on the one hand, be supplied with electrical energy via the connection elements, and therewith via the field device, or also via the energy storage unit.

In an embodiment, the adapter includes a battery, which serves for supply of at least the communication unit and/or the computing unit with electrical energy. The battery is an additional energy source for the energy storage unit and supplements the energy drawn from the process loop.

The object of the invention is, moreover, achieved by a transmitter for a 2-wire field device, especially a 2-wire field device of process and/or automation technology, which transmitter serves for determining and/or monitoring at least one process variable of a liquid, and which transmitter has an adapter of the invention. The adapter can, on the one hand, be arranged releasably within the transmitter. On the other hand, it can also be embodied as a fixed component of the transmitter. For the two embodiments, no mentionable structural modifications of the transmitter are necessary, since the adapter is contacted, especially electrically, in both cases by means of the two connection elements.

Finally the object of the invention is achieved by a 2-wire field device, especially a 2-wire field device of process and/or automation technology, comprising an adapter of the invention or a transmitter of the invention.

The embodiments described with reference to the adapter can be applied mutatis mutandis to the transmitter of the invention and the field device of the invention.

BRIEF DESCRIPTION OF THE DRAWINGS

The invention will now be explained in greater detail based on the appended drawing, the figures of which show as follows.

DETAILED DESCRIPTION

Figure 1:
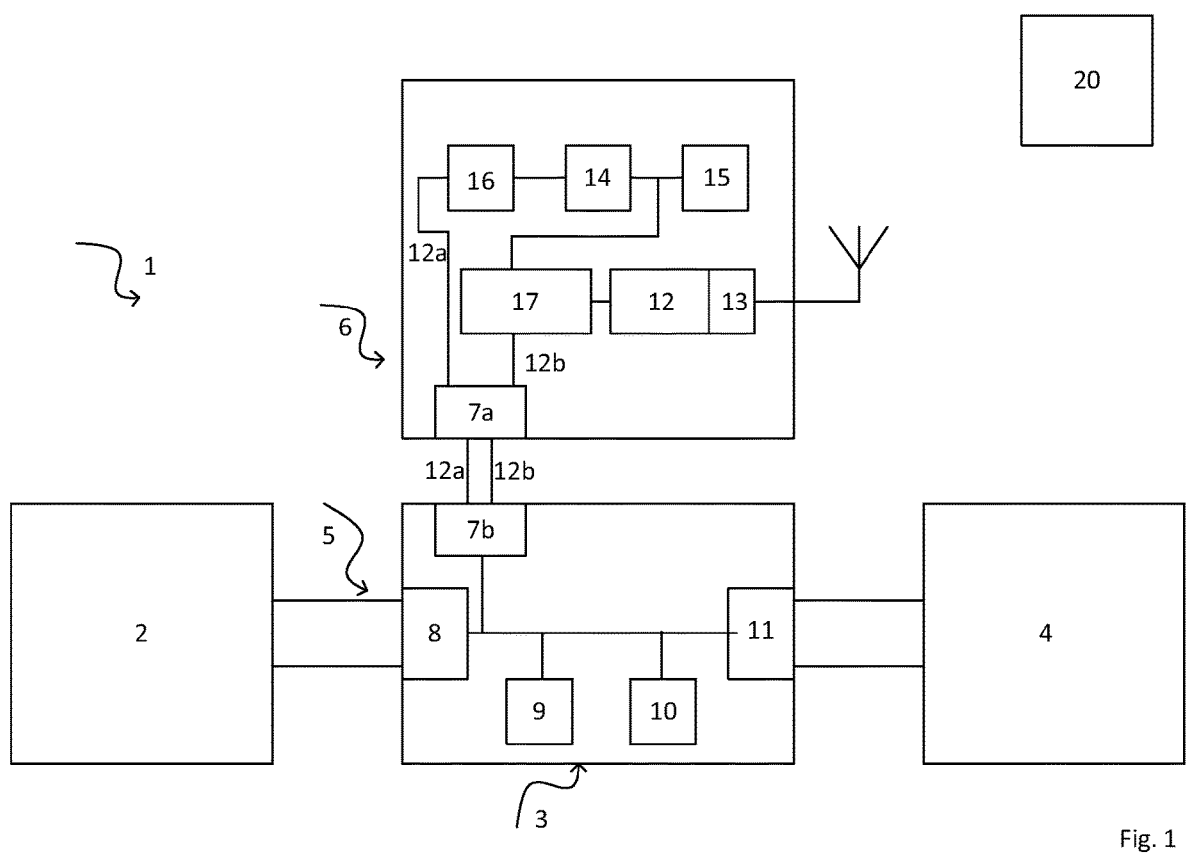
FIG. 1 shows a schematic view of a field device with a transmitter and an adapter of the present disclosure in a first embodiment of the present disclosure.

In the figures, equal elements are provided with equal reference characters.

Without intending to limit the generality of the invention, the following description is directed to a field device in the form of a measuring device 1 with a sensor unit 2 and a transmitter 3, via which transmitter 3 the measuring device 1 is connected with a control system 4. The measuring device 1 is embodied as a 2-wire field device and is connectable to a 2-wire process loop 5.

The communication to the control system 4 occurs correspondingly via a two conductor bus 5, for instance, via a HART, PROFIBUS PA or FOUNDATION Fieldbus. It is also possible to embody the connection to the bus supplementally or alternatively as a wireless interface, for instance, according to the wireless HART standard, wherein via wireless HART a connection can be provided directly to a control system 4 via a gateway. Moreover, in the case of the HART protocol, a 4 . . . 20 mA interface is optionally or supplementally implementable.

FIG. 1 shows a first embodiment of an adapter 6 of the invention. Adapter 6 includes a first connection element 7a, by means of which it is connectable, especially releasably, with a second connection element 7b complementary to the first connection element 7a. However, for other, here not shown, embodiments, the second connection element 7b can also be a part of another component of the field device 1. Also, field devices 1 are known, wherein the transmitter 3 and the sensor unit 2 are embodied as one piece.

The operation of a transmitter 3 is per se sufficiently known in the state of the art and is, therefore, not described in detail here. The transmitter 3 of FIG. 1 includes, for example, an analog-digital converter 8, by means of which a measurement signal received from the sensor unit 2 is digitized. In terms of other components for signal processing, the transmitter 3 comprises a computing unit 9, for example, a controller, and a DC-DC converter 10, as well as a control unit 11, especially for controlling an electrical current.

The connection elements 7a,7b are preferably interfaces that fit one another, especially complementary interfaces. Preferably, they are serial interfaces, such as, for example, CDI, UART, I2C or SPI interfaces. Associated with the interfaces 7a,7b are at least two mutually complementary contacting elements 12a,12b, of which a first contacting element 12a serves for supplying the adapter 6 with electrical energy, and a second contacting element 12b serves for exchanging information, e.g. data, between the adapter 6 and the transmitter 3, preferably in the form of electrical signals. Of course, the connection elements 7a, 7b can also have more than two contacting elements 12a,12b.

Adapter 6 includes a communication unit 13 with a wireless signal transmission unit 14, which in the embodiment shown here is a Bluetooth module. The Bluetooth module is preferably embodied in such a manner that it conforms to the low energy protocol stack as "Bluetooth Low Energy" (also known as BTLE, BLE, or Bluetooth Smart) or at least to the standard "Bluetooth 4.0". Via the adapter 6, or via the communication unit of the adapter 6, the field device can communicate with an external unit 20, for example, with a control station 4, an external unit 20, for example, a durably installed device, such as a computer, or a mobile unit, e.g. a mobile telephone, tablet or notebook, or also with an external module, such as, for example, a display or a diagnostic module.

Field device 1, or its relevant components, can be embodied by means of the adapter 6 both for unidirectional as well as also for bidirectional communication with the external unit 20. This relates to both the energy supply as well as also the transmission of the information. The information is, for example, data for a parametering of the field device 1, thus data sent from the external unit 20 to the field device 1, or also data in the form of measured values ascertained by means of the field device 1 and transmitted from the field device 1 to the external unit 20.

For energy supply, the adapter includes an energy storage unit 15, which supplies at least the communication unit 13 with electrical energy. For wireless transmission of information, the communication unit 13 has a temporarily increased energy requirement, which usually cannot be covered by the two-wire process loop 5. The energy storage unit 15 is preferably a capacitor or a supercapacitor. In the ongoing operation, excess energy from the process control loop is stored via the connection elements 7a,7b interim in the energy storage unit 15, and then can be provided as needed to the individual components of the adapter 6, especially the communication unit 13.

Optionally, a battery 16 can be supplementally provided, which can, for example, however, not absolutely, likewise be associated with the energy storage unit 15. This provides as needed energy in addition to that coming from the process loop 5.

Likewise optional is the integration of a unit 17 for electrical current- and/or voltage limiting. This is especially relevant when the field device 1 is to be applied in an explosion-endangered atmosphere.

Finally, the adapter can have a computing unit 18. The computing unit 18 can be used, for example, to control the energy supply of the communication unit 13, however, also to further process and forward information received by means of the connection elements 7a,7b, or, when a bi directional communication is possible, likewise via the communication unit.

Figure 2:
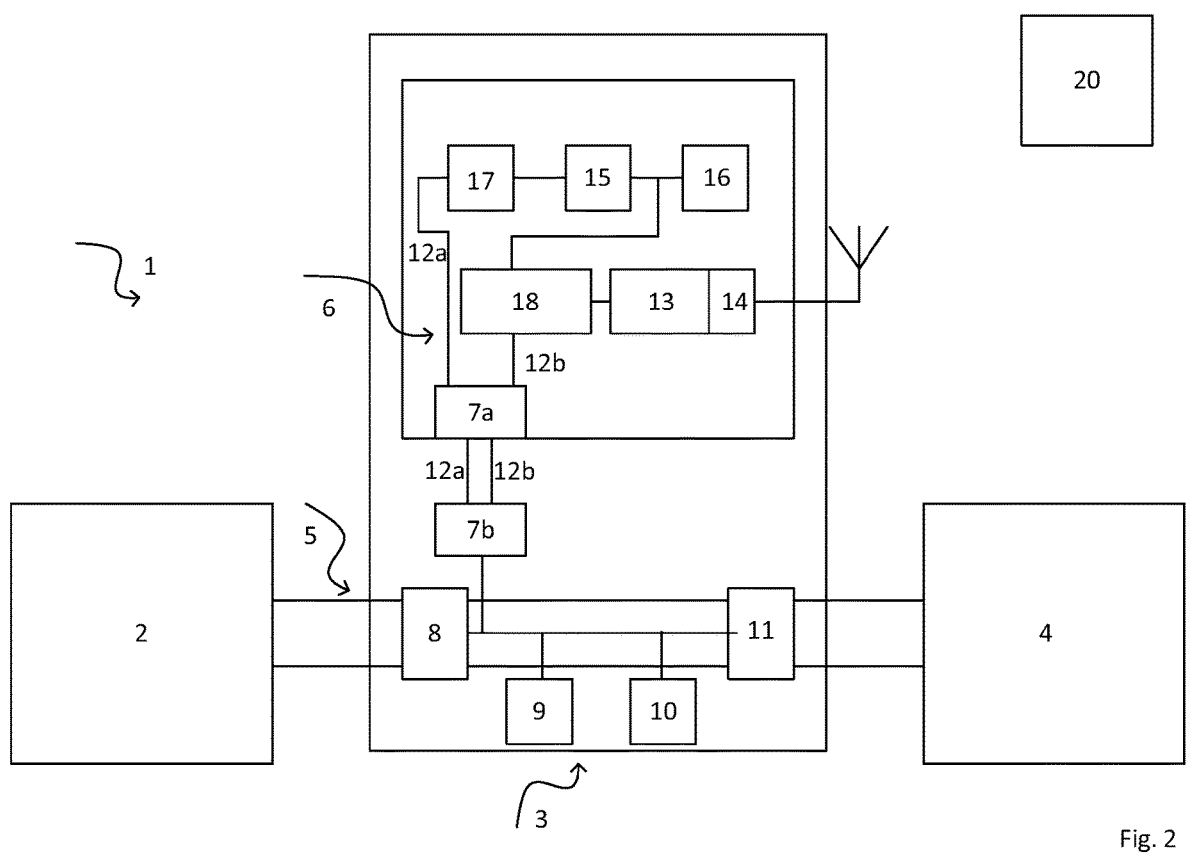
FIG. 2 shows a schematic view of a field device with a transmitter and an adapter of the present disclosure in a second embodiment.

A second embodiment of the present invention is shown by way of example in FIG. 2. In this case, the adapter is embodied as integral component of the transmitter 3. As in FIG. 1, the electrical connecting of the adapter, or its components, occurs via the connection elements 7a, 7b.

The invention claimed is:

1. An adapter for a two-wire field device of process and/or automation technology, comprising:
a communication unit for communication with an external unit;
an energy storage unit for supply of at least the communication unit with electrical energy; and
a first connection element for an electrical contacting of the adapter with a second connection element of the field device, wherein the second connection element is complementary to the first connection element, wherein the first connection element and the second connection element are embodied for supply of at least the adapter with electrical energy and for exchanging information, wherein the first connection element and the second connection element are embodied to supply at least the adapter with electrical energy and to exchange information separately from one another, and wherein each of the connection elements includes at least a first contact element for energy supply and at least a second contact element for information or data exchange.

2. The adapter as claimed in claim 1, further comprising:
a unit for electrical current and/or voltage limiting.

3. The adapter as claimed in claim 1,
wherein the first connection element and the second connection element are embodied in such a manner that the supply with electrical energy and/or the exchanging of information is/are performable bidirectionally.

4. The adapter as claimed in claim 1,
wherein the first connection element and the second connection element are each a serial interface.

5. The adapter as claimed in claim 1,
wherein the communication unit includes a wireless signal transmission unit.

6. The adapter as claimed in claim 5, wherein the wireless signal transmission unit is a Bluetooth module.

7. The adapter as claimed in claim 1, further comprising:
a computing unit embodied to control the supply of the communication unit with electrical energy via the connection elements and/or via the energy storage unit.

8. The adapter as claimed in claim 7, further comprising:
a battery which serves for supply of at least the communication unit and/or the computing unit with electrical energy.

9. The adapter as claimed in claim 1, wherein the communication unit is embodied for wireless communication.

10. The adapter as claimed in claim 1, wherein the communication unit is embodied for bi-directional communication.

11. A transmitter for a two-wire field device of process and/or automation technology, which transmitter serves for determining and/or monitoring at least one process variable of a liquid, comprising:
an adapter including:
a communication unit for wireless, bi-directional communication with an external unit;
an energy storage unit for supply of at least the communication unit with electrical energy; and
a first connection element for electrical contacting of the adapter with a second connection element of the field device, wherein the second connection element is complementary to the first connection element, wherein the first connection element and the second connection element are embodied for supply of at least the adapter with electrical energy and for exchanging information, wherein the first connection element and the second connection element are embodied to supply at least the adapter with electrical energy and to exchange information separately from one another, and wherein each of the connection elements includes at least a first contact element for energy supply and at least a second contact element for information or data exchange.

12. A two-wire field device of process- and/or automation technology, comprising:
an adapter including:
   a communication unit for wireless, bi-directional communication with an external unit;
   an energy storage unit for supply of at least the communication unit with electrical energy; and
   a first connection element for electrical contacting of the adapter with a second connection element of the field device, wherein the second connection element is complementary to the first connection element, wherein the first connection element and the second connection element are embodied for supply of at least the adapter with electrical energy and for exchanging information, wherein the first connection element and the second connection element are embodied to supply at least the adapter with electrical energy and to exchange information separately from one another, and wherein each of the connection elements includes at least a first contact element for energy supply and at least a second contact element for information or data exchange.

* * * * *